United States Patent [19]

Sutton

[11] 4,427,905

[45] Jan. 24, 1984

[54] COMBINED LINEAR MOTOR AND SIDE MOUNTED OUTBOARD CARRIAGE

[75] Inventor: David A. Sutton, Santa Ynez, Calif.

[73] Assignee: DMA Sytems Corporation, Goleta, Calif.

[21] Appl. No.: 504,082

[22] Filed: Jun. 16, 1983

Related U.S. Application Data

[63] Continuation of Ser. No. 321,388, Nov. 16, 1981, abandoned.

[51] Int. Cl.³ .......................................... H02K 41/02
[52] U.S. Cl. ...................................... 310/13; 310/27
[58] Field of Search ................................. 310/12–13, 310/19, 27

[56] References Cited

U.S. PATENT DOCUMENTS

| | | | |
|---|---|---|---|
| 3,505,544 | 4/1970 | Helms | 310/13 |
| 3,521,092 | 7/1970 | Kalthoff | 310/13 |
| 3,666,977 | 5/1972 | Helms et al. | 310/13 |
| 3,723,779 | 3/1973 | Gillum | 310/13 |
| 3,723,780 | 3/1973 | Gillum | 310/13 |
| 3,735,163 | 5/1973 | Dijkstra et al. | 310/13 |
| 3,743,870 | 7/1973 | Hunt | 310/13 |
| 3,881,189 | 4/1975 | Mayeda | 360/106 |
| 3,899,699 | 8/1975 | Griffing | 310/13 |
| 4,006,372 | 2/1977 | Brown, Jr. et al. | 310/13 |
| 4,185,836 | 1/1980 | Taylor et al. | 274/23 A |
| 4,208,685 | 6/1980 | Matla et al. | 360/107 |
| 4,253,126 | 2/1981 | Kuribayashi et al. | 360/107 |
| 4,287,445 | 9/1981 | Lienau | 310/13 |

*Primary Examiner*—Donovan F. Duggan
*Attorney, Agent, or Firm*—Spensley, Horn, Jubas & Lubitz

[57] ABSTRACT

A linear motor and side mounted outboard carriage combination comprising an elongated magnetic core having a longitudinal motion axis, an armature associated with the core and being movable along the axis, plural carriage ways secured on opposite sides of the core, and a carriage assembly mounted on the ways and connected to the armature for movement therewith along the axis, portions of the carriage assembly being mounted on the opposite sides of the core and being so arranged that the center of gravity of the carriage assembly and all elements connected thereto is approximately aligned with the center of force of the core.

13 Claims, 6 Drawing Figures

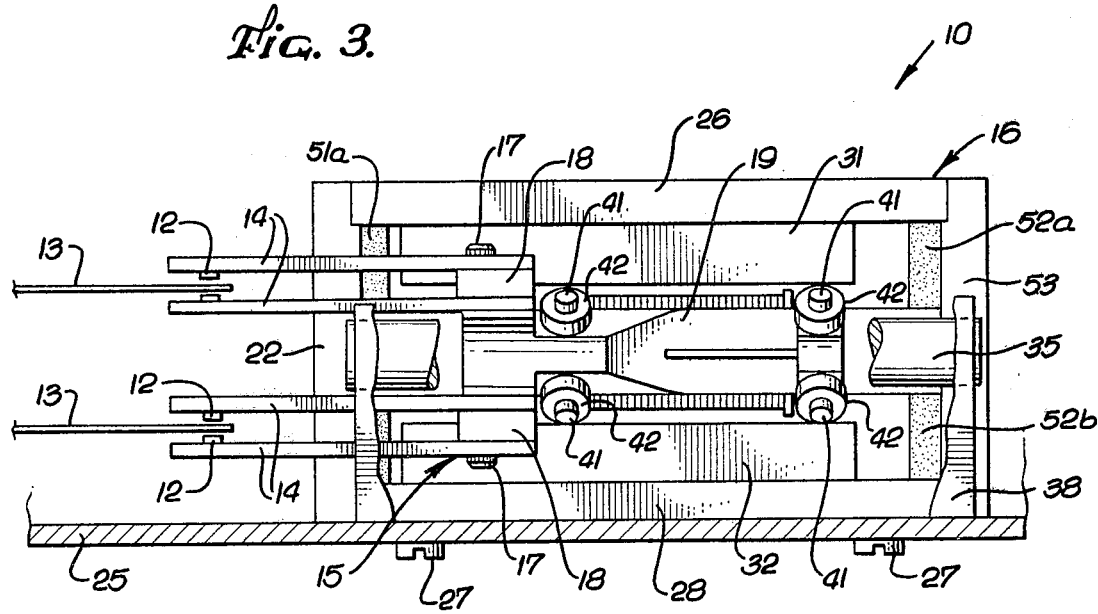
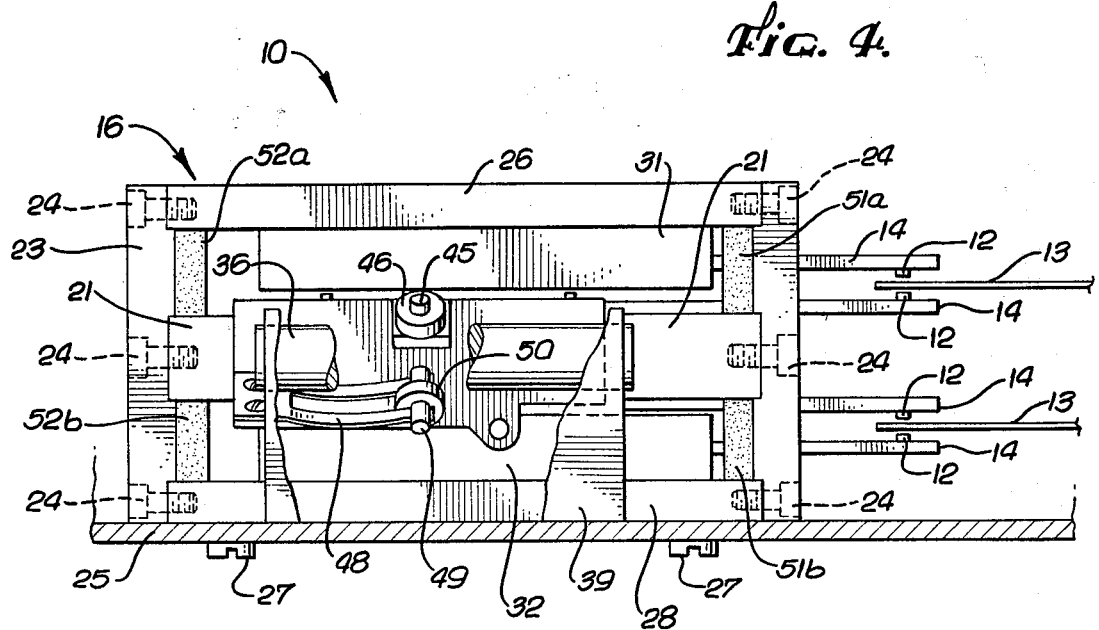

COMBINED LINEAR MOTOR AND SIDE MOUNTED OUTBOARD CARRIAGE

This is a continuation of application Ser. No. 06/321,388, filed on Nov. 16, 1981, now abandoned.

BACKGROUND OF THE INVENTION

1. Field of the Invention

The present invention relates to a linear motor and side mounted outboard carriage combination and, more particularly, to such a linear motor and carriage in which the center of gravity of the carriage and motor armature is aligned with the center of force of the linear motor.

2. Description of the Prior Art

While linear electric motors have many uses in industry, the present invention will be described with reference to a linear motor and carriage for use in a magnetic disc storage system for moving read-write transducers over the surface of moving data media discs. Such use of a linear motor calls for extremely high precision of movement.

Magnetic disc storage systems of the type in which the present linear motor may be used are widely used to provide large volumes of relatively low-cost computer-accessible memory or storage. A typical disc storage device includes a number of discs coated with a suitable magnetic material mounted for rotation on a common spindle and a set of transducer heads carried in pairs on elongate supports for insertion between adjacent discs, the heads of each pair facing in opposite directions to engage opposite faces of adjacent discs. The support structure is coupled to the linear motor, the linear motor typically including a coil mounted within a magnetic field for linear movement and oriented relative to the discs to move the heads radially over the disc surfaces to thereby enable the heads to be positioned over any annular track on the surfaces. In normal operation, the linear motor, in response to control signals from the computer, positions the transducer heads radially for recording data signals on or retrieving data signals from a preselected one of a set of concentric recording tracks on the discs.

A widely used computer motor is open at one end and a helical armature coil supported by a matching cylindrical tube projects into the open end of the motor. The coil is adhered to the end of the tube and the tube is mounted on a carriage that moves back and forth under influence of the motor coil. The equipment to be moved is mounted on the carriage. The carriage moves on accurately ground ways so that the equipment (read-write transducers) secured to the carriage is moved with great accuracy.

It has been generally believed that the dynamic accuracy necessary for movement of read-write transducers along an exact axis requires that the carriage be coaxial with the linear motor and that the mounting for the transducers also be coaxial. It has been generally believed that the non-coaxial transfer of motion from the armature coil would result in torques and moments that would so distort the carriage and its components that the required accuracy could not be achieved.

Unfortunately, when mounting the carriage coaxially with the linear motor, considerable length is required to accommodate the heads, coil and magnetic structure. With the present emphasis on providing magnetic storage systems in as small a package as possible, too much longitudinal space is required for a motor/carriage coaxial arrangement.

As a space saving innovation, it has been proposed to provide a carriage mounted on the side of a linear electric motor for motion parallel to the armature axis. A typical such combined linear motor and side mounted carriage combination is disclosed and claimed in U.S. Pat. No. 3,656,015 to Donald E. Gillum and entitled "Combined Linear Motor and Carriage". By mounting the carriage off to one side, the magnetic structure need not be in series with the heads and the carriage.

Experience has shown that serious problems do indeed arise from this type of structure because the center of gravity of the moving mass does not line up with the center of force provided by the motor. Structural resonance has proved to be a serious problem with this configuration since the offset force excites lateral vibration modes not seen in a coaxial structure. The only think that resists the lateral force is the bearing preload and, under certain circumstances, this can be overcome, knocking the carriage bearings off their ways. This often occurs in a runaway situation. That is, one problem with linear motors and servo loops in general is that they can get lost. In other words, the computer could signal the linear motor to move the transducer head in one direction, searching for a track which the head has in fact already passed. Often, the head continues accelerating until it reaches a mechanical stop at the end of its travel. The impact of hitting the mechanical stop with the center of gravity of the moving mass misaligned with the center of force can and does knock a bearing off its track because the force overcomes the bearing preload.

SUMMARY OF THE INVENTION

In accordance with the present invention, these problems are solved in a manner unknown heretofore. The present invention solves the length problem necessary to accommodate heads, armature and magnetic structure in a series arrangement by providing a side mounted outboard carriage. Still further, the present invention overcomes the structural resonance and offset force problems of the Gillum design by arranging the carriage and the carriage ways so that there is an equal mass on each side of the center of force so that the center of gravity and the center of force are coaxial. As a result, there are no offset torquing forces and structural resonance problems are eliminated. This also permits the location of a crash stop very close to the center of gravity so that as the carriage assembly decelerates, it is not rotated.

Briefly, a linear motor and side mounted outboard carriage combination constructed in accordance with the teachings of the present invention comprises an elongate magnetic core having a longitudinal motion axis, an armature associated with the core and being movable along the axis, plural carriage ways secured on opposite sides of the core, and a carriage assembly mounted on the ways and connected to the armature for movement therewith along the axis, portions of the carriage assembly being mounted on the opposite sides of the core and being so arranged that the center of gravity of the carriage assembly and all elements connected thereto is aligned approximately with the center of force of the core.

OBJECTS, FEATURES AND ADVANTAGES

Therefore, the object of the present invention is to solve the problems associated with linear motors with side mounted outboard carriages. It is a feature of the present invention to solve these problems by arranging the center of gravity of the carriage and armature so that it is aligned with the center of force of the core and armature. An advantage to be derived is the elimination of forces attempting to rotate the carriage assembly. A further advantage is the elimination of structural resonance problems. A still further advantage is the elimination of the likelihood of the carriage bearings being knocked off its ways. Another advantage is making the voice coil a structural member. Another advantage is a side mounted carriage having a compact size. Another advantage is a bearing guidance system which is symmetrical about the center line of force and motion. Another advantage is the ability to provide crash stop bumpers located internal to the magnetic structure on the center line of the moving mass.

Still other objects, features, and attendant advanges of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIGS. 3, 4 and 5 are sectional views taken along the lines 3—3, 4—4 and 5—5, respectively, in FIG. 2.

DESCRIPTION OF THE PREFERRED EMBODIMENT

Figure 1:
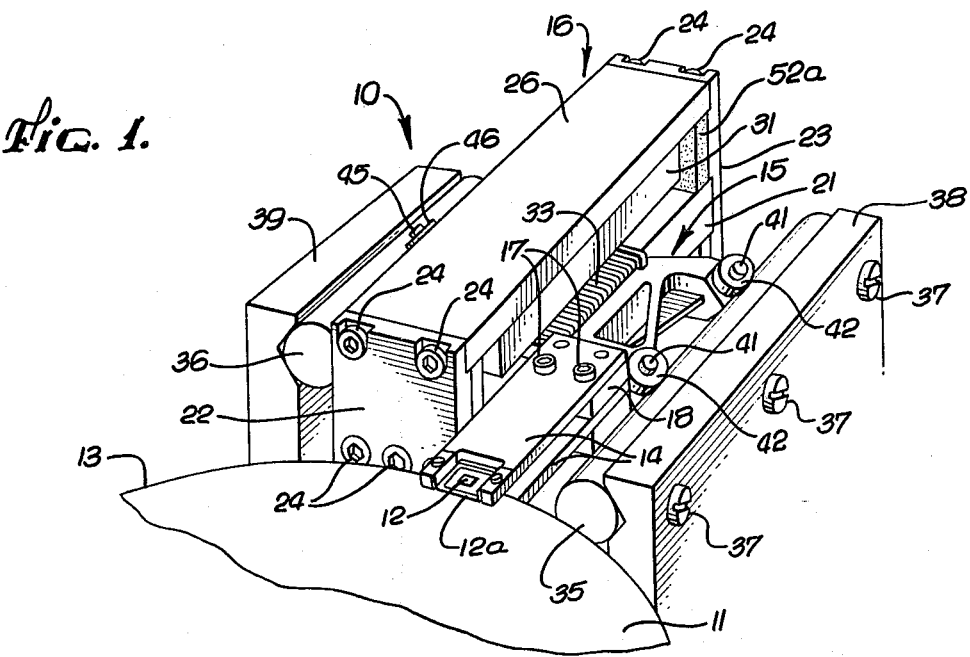
FIG. 1 is a perspective view of a linear motor and side mounted outboard carriage combination constructed in accordance with the teachings of the present invention, shown in operative relationship to a fixed support and a rotating magnetic disc.
Figure 2:
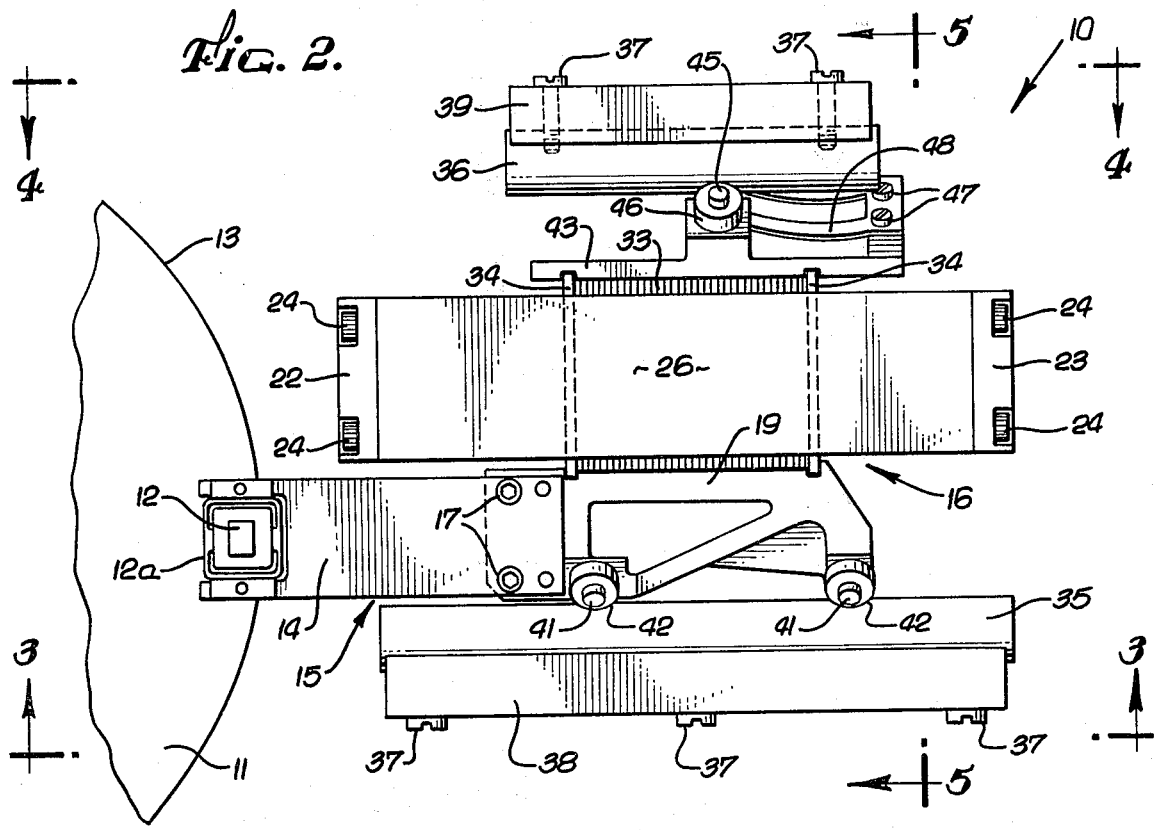
FIG. 2 is a top plan view thereof.

Referring now to the drawings, there is shown a combined linear motor and side mounted outboard carriage, generally designated 10, which is shown in its preferred embodiment as being used in a magnetic data storage system for moving read-write transducers 12 over the surfaces 11 of moving data media, such as discs 13. Discs 13 typically have a magnetic material coated on both surfaces 11 thereof to enable data to be magnetically recorded thereon. Discs 13 would be mounted coaxially on a spindle (not shown) which is driven by a spindle motor (not shown) which rotates discs 13 about an axis defined by the spindle.

Data is recorded on disc surfaces 11 by signals applied to transducer assemblies 12, typically referred to as "heads". Heads 12 are connected by gimbal assemblies 12a to the free ends of rigid cantilevered arms 14. As shown in FIGS. 1, 3 and 4, multiple arms 14/heads 12 can be mounted in facing relationship to transcribe data on the opposite surfaces 11 of discs 13, all of arms 14 being connected to a common portion 19 of a carriage, generally designated 15. As will be described more fully hereinafter, carriage 15 is physically coupled to the moving coil (armature) of a linear positioner motor, generally designated 16, which, in response to the application of positioning signals thereto, is capable of linearly moving carriage 15 so as to linearly move heads 12 radially over surfaces 11. This permits heads 12 to be selectively positioned over any one of a plurality of annular recording tracks defined on disc recording surfaces 11.

In normal operation, that is, when heads 12 are writing data onto or reading data from surfaces 11 of discs 13, heads 12 will be loaded. When a head is loaded, it simply means that a spring force is acting upon the head to urge it toward surface 11 of disc 13. This force is counteracted by an air cushion caused by the rapid rotation of disc 13 so that head 12 actually flies immediately above surface 11. In magnetic disc drives, heads 12 may fly at distances of less than 20 microinches above surfaces 11. For a more complete description of the means for supporting heads 12 above surfaces 11, for applying the force thereto, and for withdrawing heads 12 from surfaces 11, reference should be had to copending application Ser. No. 321,884, filed concurrently herewith and entitled "Head Loading and Retraction Apparatus for Magnetic Disc Storage Systems" and assigned to DMA Systems Corporation, the assignee of the present application.

Motor 16 includes a magnetic structure constructed preferably of high permeability iron. This structure consists of a central core 21, two end plates 22 and 23, a top plate 26 and a bottom plate 28. Fastening screws 24 are used to attach end plates 22 and 23 to core 21 and plates 26 and 28. Screws 27 are used to hold the entire magnetic structure to a base support 25. The result is a very rigid support structure for motor 16.

Figure 5:
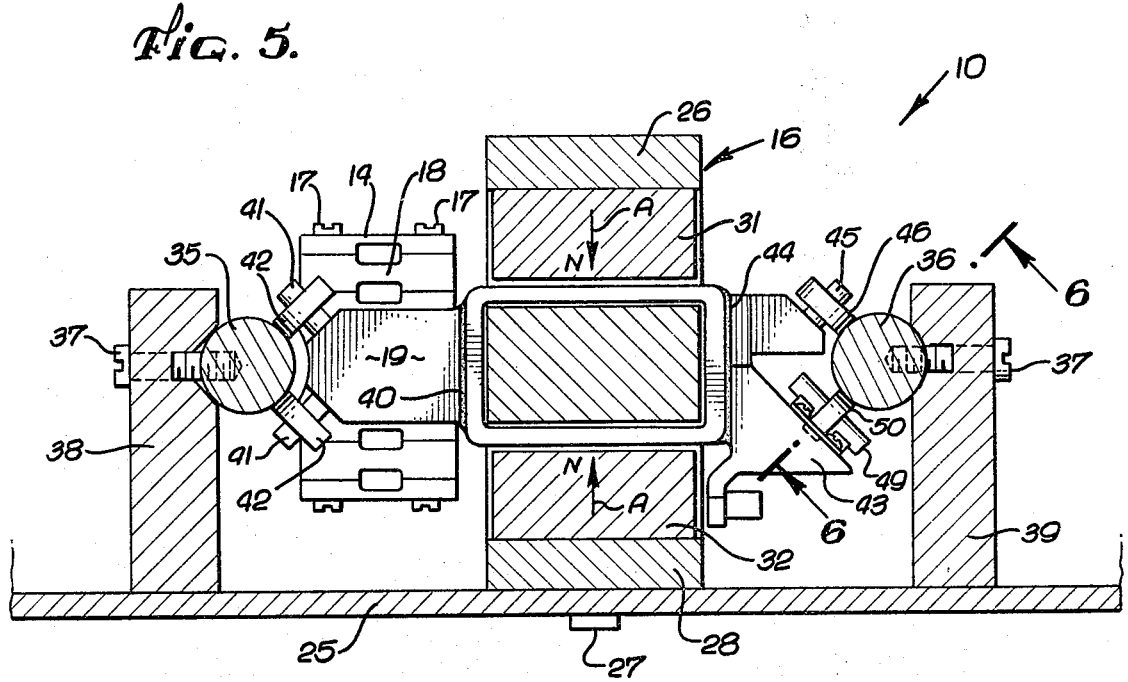
Figure 6:
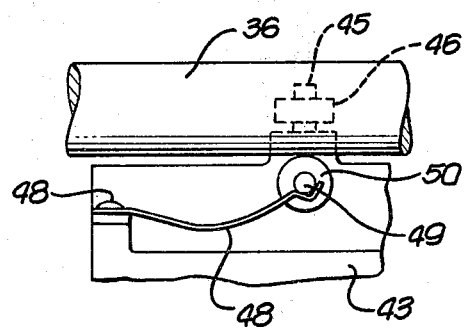
FIG. 6 is a partial sectional view taken along the line 6—6 in FIG. 5.

A pair of permanent magnet slabs 31 and 32 are fastened to a top plate 26 and bottom plate 28, respectively. Epoxy is the preferred means for fastening. Magnetization of slabs 31 and 32 is in the vertical direction, as shown by arrows "A" (FIG. 5). As shown most clearly in FIG. 5, magnets 31 and 32 are positioned in spaced relationship on opposite sides of core 21 to provide a working air gap between the interior surfaces of magnets 32 and 32 and core 21. Disposed within these working air gaps is a helically-wound coil 33 of conductor material, such as copper or aluminum, coil 33 having a rectangular cross-section and being wound on a suitable tube (not shown) and having end flanges 34. The result is that coil 33, its support tube, and flanges 34 surround core 21 and reciprocate back and forth along the length of core 21, depending upon the current passed through coil 33. The operation of such a linear motor is well known to those skilled in the art.

Motor/carriage 10 includes a plurality of carriage ways, specifically rods 35 and 36, secured on opposite sides of motor 16. More specifically, rods 35 and 36 may be bolted by means of bolts 37 to the sides of supports 38 and 39, respectively, connected to base support 25. The longitudinal axes of rods 35 and 36 are parallel, parallel to the longitudinal axis of core 21, and the axes of rods 35 and 36 and core 21 are preferably coplanar.

Opposed support arms 14 can be bolted together by means of bolts 17 with a spacer 18 therebetween. The ends of arms 14 adjacent bolts 17 and spacer 18 are connected to first portion 19 of carriage 15 positioned on one side of motor 16. Carriage portion 19 is a structural member having any desired configuration suitable for its function, to be described. One end of carriage portion 19 is connected to arms 14 and spacers 18 by bolts 17, as described previously. One side of carriage portion 19 is connected to flanges 34 and coil 33, such as by being epoxied thereto, as shown at 40. The opposite side of carriage portion 19 supports, by means of a plurality of axles 41, a plurality of roller bearings 42 which engage rod 35 at approximately 90° intervals. Four spaced roller bearings, two above and two below, provide sufficient support for carriage portion 19 to ensure accurate linear movement thereof along rod 35.

Carriage 15 includes an additional carriage portion 43 mounted on the side of coil 33 opposite to carriage portion 19. As was the case with carriage portion 19, carriage portion 43 has any shape suitable for its function and operation. As shown most clearly in FIGS. 2, 4, 5 and 6, carriage portion 43 is an elongate member, one side of which is connected to flanges 34 and coil 33, such as by being epoxied thereto, as shown at 44. The opposite side of carriage portion 43 supports, by means of an axle 45, a roller bearing 46 which engages the upper portion of rod 36. The same side of carriage portion 43 also has connected thereto, by means of screws 47, one end of a spring member 48, the other end of which supports an axle 49 on which a roller bearing 50 is mounted. Roller bearing 50 engages the lower portion of rod 36. The combination of roller bearings 46 and 50 provides sufficient support for carriage portion 43 to ensure accurate linear movement thereof along rod 36. Furthermore, by spring mounting roller bearing 50, carriage 15 is self-adjusting, i.e., it aligns itself with rods 35 and 36, whereby the entire movable carriage assembly remains aligned to the magnet structure.

It can be seen that coil 33 is, in essence, used as a structural member to interconnect carriage portions 19 and 43 which are mounted on opposite sides thereof. According to the teachings of the present invention, the mass of carriage portion 43 is adjusted to be equal to the combined mass of carriage portion 19, arms 14 and the structure supported thereby so that the center of mass of the entire moving structure is aligned with the center of force of motor 16. As a result, as motor 16 drives coil 33 and carriage 15, there is no resulting torque so that any resonance or structural deflection does not result in physical deflection of the line of travel of heads 12.

Also in accordance with the present invention, four stops 51a, 51b and 52a, 52b are mounted at opposite ends of motor 16, internally of the magnetic structure. Specifically, stops 51a, 51b and 52a, 52b are made from a suitable resilient material and are connected to the facing sides of supports 22 and 23, respectively. As seen most clearly in FIG. 4, stops 51a and 52a extend between core 21 and top plate 26 whereas stops 51b and 52b extend between core 21 and bottom plate 28. What should be apparent is that stops 51a, 51b and 52a, 52b can be positioned very close to the center of gravity and symmetrically thereabout so that if flanges 34, which form the ends of coil 33, strike same, carriage 15 is decelerated without simultaneously applying a torque thereto.

The features and advantages of the present invention should now be apparent. Carriage 15 is side mounted relative to motor 16 to decrease the overall length of motor/carriage 10. The bearing guidance system consisting of rods 35 and 36 is symmetrical about the center line of force and motion. The moving mass is balanced about the line of force and the plane of guidance. Stops 51 and 52 are located internally to the magnetic structure on the center line of the mass. The result is a highly efficient linear motor and side mounted outboard carriage combination.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A linear motor and side mounted outboard carriage combination comprising:
   an elongate magnetic core having a longitudinal motion axis;
   an armature associated with said core and being movable along said axis;
   plural carriage ways secured on opposite sides of said core; and
   a carriage assembly mounted on said ways and connected to said armature for movement therewith along said axis, said carriage assembly comprising:
   a first carriage portion positioned on one side of said core;
   a second carriage portion positioned on an opposite side of said core; and
   a magnetic head assembly connected to said first carriage portion and positioned on said one side of said core, the mass of said second carriage portion being approximately equal to the combined mass of said first carriage portion and said magnetic head assembly whereby the center of gravity of said first and second carriage portions of said magnetic head assembly is approximately aligned with the center of force of said core.

2. A linear motor and side mounted outboard carriage combination according to claim 1, wherein said magnetic core is supported at the opposite ends thereof and wherein said armature surrounds said core for reciprocation relative thereto.

3. A linear motor and side mounted outboard carriage combination according to claim 2, wherein said armature comprises:
   a tube surrounding said core and having end flanges; and
   a helical coil of conductor material wound on said tube, between said flanges.

4. A linear motor and side mounted outboard carriage combination according to claim 3, wherein said first carriage portion is positioned on one side of said core and connected to said tube flanges and wherein said second carriage portion is positioned on an opposite side of said core and connected to said tube flanges.

5. A linear motor and side mounted outboard carriage combination according to claim 4, wherein each of said carriage portions supports at least a pair of roller bearings for engaging said carriage ways.

6. A linear motor and side mounted outboard carriage combination according to claim 1 or 2, wherein said carriage ways comprises:
   first and second elongate rods positioned on opposite sides of said core, the longitudinal axis of said rods being parallel to each other and parallel to the longitudinal axis of said core.

7. A linear motor and side mounted outboard carriage combination according to claim 6, wherein the axes of said rods and said core are coplanar.

8. A linear motor and side mounted outboard carriage combination according to claim 6, wherein one side of said first carriage portion is structurally connected to said armature, the opposite side of said first carriage portion supporting a plurality of roller bearings which engage said first rod.

9. A linear motor and side mounted outboard carriage combination according to claim 8, wherein different ones of said roller bearings supported by said first carriage portion engage different portions of said first rod.

10. A linear motor and side mounted outboard carriage combination according to claim 8, wherein one side of said second carriage portion is structurally connected to said armature, the opposite side of said second carriage portion supporting a plurality of roller bearings which engage said second rod.

11. A linear motor and side mounted outboard carriage combination according to claim 10, wherein different ones of said roller bearings supported by said second carriage portion engage different portions of said second rod.

12. A linear motor and side mounted outboard carriage combination according to claim 1, 2, 3, 4 or 5, further comprising:
   a pair of mechanical stops made from a resilient material positioned in the path of said armature.

13. A linear motor and side mounted outboard carriage combination according to claim 12, wherein said stops are positioned approximately on the center line of said carriage assembly.

* * * * *